INVENTOR
LOUIS V. TARDOSKEGYI

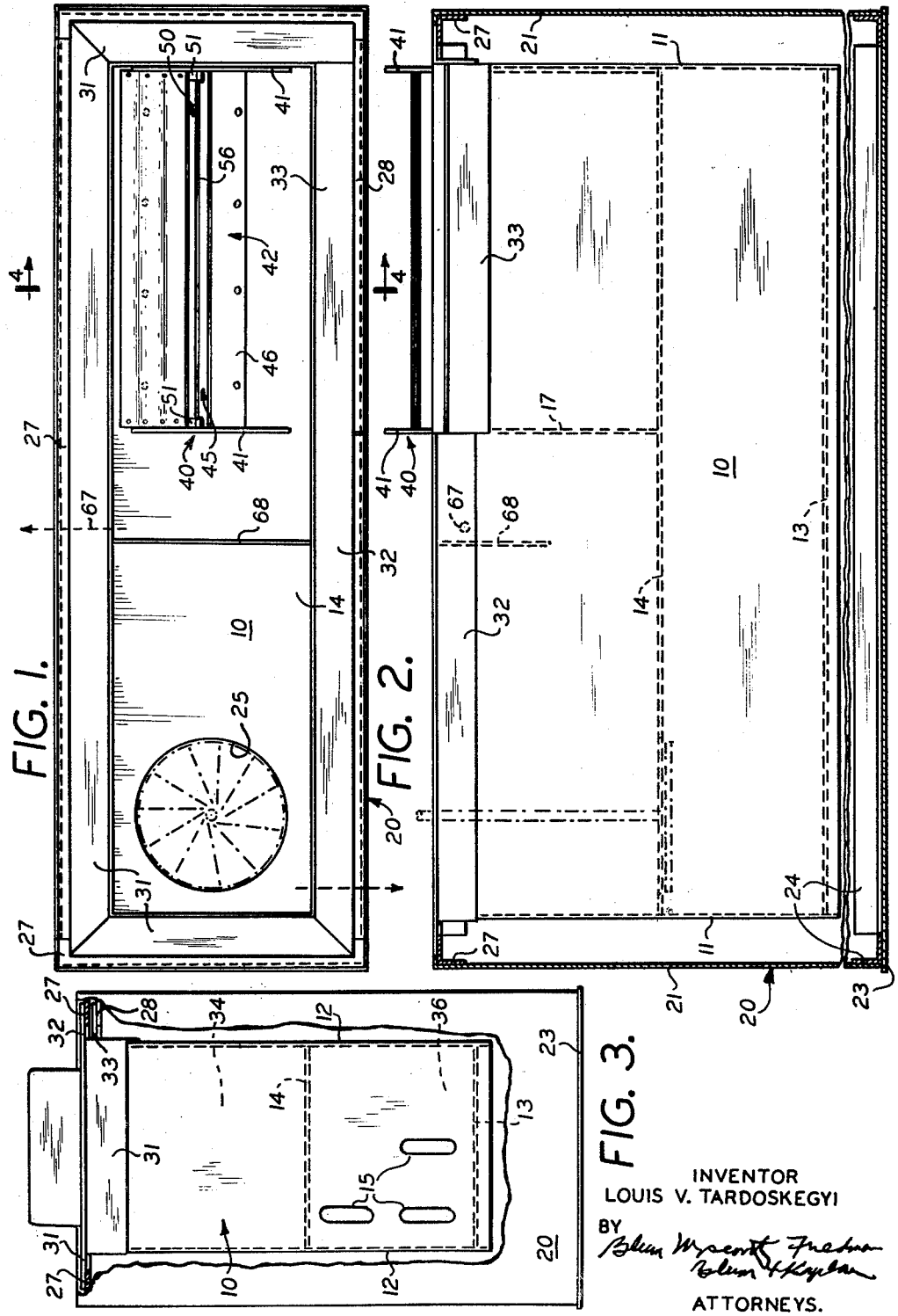

ATTORNEYS.

3,190,527
MEANS FOR APPLYING OIL FILM TO
SOLDER WAVE
Louis V. Tardoskegyi, Montreal, Quebec, Canada,
assignor to Electrovert Manufacturing Co. Ltd.,
Montreal, Quebec, Canada, a corporation of
Canada
Filed Oct. 30, 1963, Ser. No. 320,616
11 Claims. (Cl. 228—37)

This invention relates to soldering apparatus of the solder wave type and, more particularly, to novel means for applying a continuous very thin film of oil, or other similar additive, over the surface of the solder wave.

In the art of tin plating and soldering, it has long been established that the use of organic or mineral oils in connection with the operations has the advantageous effect of achieving an even distribution and proper application of solder or of tin coatings on metal surfaces. The purpose of using such oil is to improve the surface and interfacial tension conditions existing between a solder and a fluxed board, for example, during the soldering operation, and to develop a type of "skin effect" in the nature of a smooth, continuous and very thin and substantially invisible protective layer of oil which will prevent oxidation of the solder surface between soldering intervals. Thus, the oil will act as an oxide barrier during the soldering operation itself, and thereby contributes to the fluxing action.

The application of a layer of oil or other additive to the surface of a stationary or quiescent solder bath, as well as the maintenance of such layer, does not present any difficulties irrespective of whether the oil used is organic or mineral. However, in the more modern technique of wave soldering, wherein there is a projecting wave of solder which is continuously replenished and which flows back into a solder tank, the application of an even distributed and continuous layer of oil or other additive, and particularly the application and maintenance of a layer of an accurately controllable and predetermined thickness, presents a very serious problem. This is due to the continuous reforming and reproduction of the wave form circulating molten solder.

It is important that changes in the constitution, characteristics and purity of the oil should be avoided in order that there may be a consistent quality of operation at all times. Furthermore, the amount of oil applied and distributed on the surface of the wave should be accurately adaptable to the height and surface area of the wave and to other operation conditions.

Various attempts have been made to introduce solder into molten solder wave apparatus. One arrangement for doing this has been to pour oil onto the surface of the bolten solder in the solder pot or tank, for gravitational flow to a vent at the suction or intake end of the solder pump. The purpose was to provide for mixing of the oil with the solder, and the oil is continuously recirculated and reused after application to printed circuit boards or the like which are brought into contact with the standing solder wave.

The disadvantage of this, and of other known arrangements, is that, due to the recirculation, the oil becomes thermally degraded, and is subjected to oxidation by exposure to heat, light and metallic catalysts such as copper and iron. Consequently, there is a contamination of the oil with a result that there is no longer a consistent and uniform quality to the oil floating on top of the solder wave. Also, the constitution of the oil changes to some extent due to partial evaporation of ingredients by the relatively high heat. An additional disadvantage of known methods is that they do not provide a uniform distribution of oil throughout the solder, the oil appearing irregularly as globules or traces, and not being dispersed uniformly throughout the molten solder.

Another difficulty with systems in which the oil is admixed with the molten solder, as the latter is pumped toward the solder nozzle, is that large globules of oil are formed in the solder thus being pumped. Thus, the surface of the soldering wave is characterized by a number of large oil spots which are separated substantially from each other by uncovered surface areas of a relatively large extent. This non-uniform disposition of the oil on the surface of the soldering wave is very disadvantageous.

In accordance with the present invention, the problem of providing a uniform very thin film of oil over a molten solder wave is solved by providing a reservoir of oil, the upper surface of which is immediately adjacent the molten solder discharged generally upwardly from a relatively long narrow nozzle, so that the molten solder will contact the oil at the upper layer thereof and will draw it out as a thin film over the molten solder wave. The rate of flow of the oil to the oil reservoir is accurately controlled by a micrometer valve so that a definite amount of oil per unit time can be supplied in correlation with the rate of flow of the molten solder forming the solder wave.

More specifically, the molten solder is circulated by a pump or the like so that the reheated solder is forced upwardly through a nozzle having a transversely elongated aperture. An oil reservoir, preferably in the form of a nozzle or trough likewise having a correspondingly transversely elongated opening, is provided immediately adjacent the solder discharge opening of the nozzle, preferably with the solder nozzle and the oil reservoir having one wall in common. The oil is injected at a uniform regulated rate into the molten solder which is returned from the solder wave and then rises upwardly into the oil trough which is open at its lower end as well as at its upper end. Consequently, should solder of the molten wave be inadvertently forced into the oil reservoir, it will merely drop down through the oil reservoir and back into the main body of solder being returned for recirculation by the solder pump.

A dam or the like is provided on top of the reservoir of solder flowing to the inlet of the solder pump, and the height of this dam is accurately regulated so that the oil film is skimmed off the returning solder and discharged. Thereby, only a fresh film of oil is provided on top of the solder wave and on top of the active surface of the molten solder, and the solder wave is continually supplied with fresh oil.

For an understanding of the principles of the invention, reference is made to the following description of a typical embodiment thereof as illustrated in the accompanying drawings. In the drawings:

FIG. 1 is a plan view of apparatus embodying the invention;

FIG. 2 is a side elevational view thereof;

FIG. 3 is a left end elevational view thereof, partly broken away;

Figure 4:
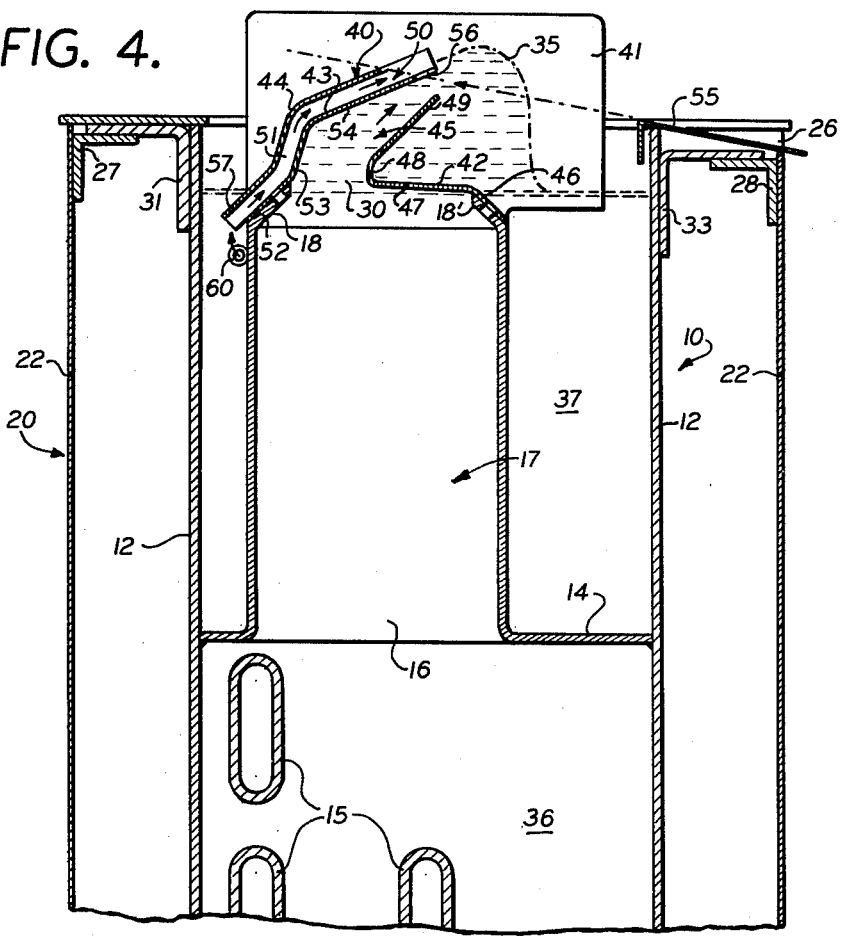
FIG. 4 is a transverse sectional view taken on the line 4—4 of FIG. 1.
Figure 5:
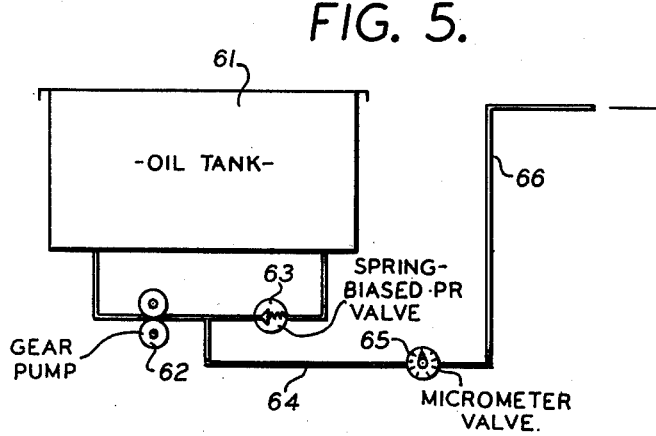
FIG. 5 is a schematic diagram of the oil supply arrangement.

Referring to FIGS. 1 through 4, a solder pot or tank is indicated at 10 as having opposite end walls 11, opposite side walls 12, and a bottom wall 13. A horizontal partition 14 extends along the tank or solder pot 10 about midway of the height of the side and end walls. Below this partition, are disposed suitable heating means, such as electric resistance coils 15.

Partition 14 is formed with a relatively elongated and substantially rectangular aperture 16 extending from adjacent the right-hand end of the solder pot, as viewed in FIGS. 1 and 2, to a point somewhat short of the center thereof. A riser or upflow channel 17, of substantially rectangular cross section, is indicated as being congruent with the opening 16 and extending upwardly therefrom to a point somewhat short of the upper edges of the side and end walls 11 and 12 of solder tank or pot 10. The upper ends of the longer side walls of the riser 17 terminate in inwardly and upwardly sloping flanges 18 and 18', of which the flange 18' is somewhat shorter than the flange 18.

Tank 10 is arranged to be supported and contained within a suitable outer casing generally indicated at 20 and including spaced end walls 21 and spaced side walls 22, each in spaced substantially parallel relation to the corresponding walls of tank 10. Casing 20 further includes a base or bottom wall 23 which is joined to the side and end walls by angles 24.

The upper edge of what may be termed the forward side wall 22 of casing 20 has a rectangular notch 26 therein substantially coextensive in length with the length of the solder riser 17. To support the solder pot 10, angles 27 and 28 are secured to each of the side and end walls 21 and 22 of casing 20 adjacent their upper edges, the angle 28 being coextensive in length with the notch 26. Correspondingly, the end walls 11 and one side wall 12 of solder tank 10 are formed with outwardly extending angles 31 arranged to rest on the inwardly extending angles 27. The forward wall 12 of solder tank 10 has a pair of angles 32 and 33 thereon, the angle 32 being at the same level as the angles 31 and the angle 33 being lowered so as to rest on the angle 28. Adjacent the left-hand end of solder pot 10, as viewed in FIGS. 1 and 2, partition 14 is formed with a circular opening 25 in which may be mounted the rotor of a suitable electric motor driven pump whose motor may be supported on the exterior casing 20.

It will be noted that partition 14 divides solder tank or pot 10 into an upper section 34 and a lower or heater section 36. The pump disposed in opening 25 circulates solder from upper section 34 into lower section 36 under pressure, so that the solder is forced upwardly under pressure through riser 17. It will be noted that upper section 34 includes an annular or embracing return flow channel 37 surrounding riser 17. The molten solder, generally indicated at 30, is forced to flow outwardly through a nozzle assembly, generally indicated at 40, to form a standing solder wave generally indicated at 35. The solder returns into channel 37 and into upper portion 34 of solder pot or tank 10, and then is forced by the pump in opening 25 to flow into lower section 36 of solder pot 10 wherein it is maintained at a uniform temperature by means of heaters 15 and flows upwardly, under pressure, into riser 17 and through nozzle assembly 40. The height of solder wave 35, indicated in FIG. 4, is the maximum height of the solder wave, and variations in the height may be attained by adjusting the rate of operation of the pump.

Nozzle assembly 40 includes a solder nozzle 45 and an oil trough 50. The nozzle assembly 40 includes a pair of side plates 41 which serve not only as lateral enclosures for the nozzle assembly but also as guide means for printed circuit plates which are to be passed over the solder wave 35. Plates 41 are substantially rectangular and are arranged to embrace the end walls of solder riser or upflow channel 17. The solder nozzle, which is substantially rectangular in cross section and which decreases in area from its entrance to its exit, is defined by a pair of plates 42 and 43, with the plate 43 also constituting one wall of the oil trough 50. The other wall of the oil trough is defined by a third plate 44. Plates 43 and 44 are arranged in spaced parallel relation so as to define a substantially rectangular oil trough. Plate 42 has a sloping portion 46 arranged to be bolted to the flange 18', and extending from a generally horizontal portion 47. However, horizontal portion 47 is not strictly horizontal but slopes upwardly at a slight angle from its juncture with the fastening portion 46. At its other end, portion 47 merges with a short vertical section 48 which, in turn, merges with an exit wall portion 49 which slopes forwardly and upwardly.

Plates 43 and 44 are separated by spacers 51. Plate 43 has a flange portion 52 secured by bolts or the like to the flange 18, an upwardly and forwardly extending intermediate portion 53, and a nozzle exit portion 54. The free edge of portion 54 has a rectangular notch 56. Plate 44 is shaped the same way as plate 43 and is held in parallel spaced relation thereto by virtue of spacers 51. However, plate 44 has an inner end 57 parallel to portion 52 of plate 43 and this inner end, as well as spacer 51, project substantially beyond the side wall of channel or riser 17. The portion 57 of plate 44 thus extends into the channel 37 surrounding the riser 17. The other or outer end of plate 44 terminates short of the outer end of the plate 43. A guide plate 55 is mounted through the notch in the upper edge of the front wall 22 of casing 20 and has its inner end extending over the front wall 12 of this solder pot or tank 10. Plate 55 thus slopes upwardly and rearwardly. The exit edges of plates 43 and 44 are beveled off so that they lie in a plane which is a continuation of the plane of the upper surface of plate 55. It will be noted that portions 49 and 54 of plates 42 and 43, defining the solder exit nozzle, converge toward each other toward the exit of the solder nozzle.

Insofar as the production of solder wave 35 is concerned, the aforementioned pump forces the solder from upper section 34 of the solder pot through aperture 25 and into lower section 36, from which the solder is forced upwardly, under pressure, through riser 17. The solder then flows through the nozzle formed by side plates 41 the two plates 42 and 43, and emerges as the wave 35. The overflow from the wave passes back into the recirculating path.

To provide a film of oil over the molten solder, an oil inlet 60 is located in an end wall of the solder pot beneath projecting portion 57 of wall 44 of oil trough 50. There is molten solder in the channel adjacent this oil inlet aperture 60, and the oil droplets rise upwardly through the molten solder and into the oil trough until such time as they have completely filled the oil trough.

The oil is supplied from an oil tank 61, and the oil withdrawn from tank 61 has its pressure raised by suitable means, such as a gear pump 62 located in a line leading from oil tank 61 and back to the oil tank. Beyond oil pump 62, there is located a spring biased pressure regulating valve 63 which may be set to a predetermined pressure such as, for example, 25 p.s.i. Intermediate pump 62 and valve 63, a line 64 is tapped off and leads to a micrometer valve 65 whose outlet is connected, by a line 66, to oil inlet 60. The pressure of the oil reaching micrometer valve 65 will be always at the value determined by back pressure valve 63. The rate of flow can be very accurately adjusted by micrometer valve 65 which may, if desired, be calibrated, for example, in cubic inches of oil per hour.

The oil is supplied to oil trough 50 to an extent such that the level of the oil therein is the same as the level of the edge of notch 56 in plate 43. The molten solder flowing between plates 42 and 43 passes this notch and, in so doing, draws a film of oil from the oil trough and this film of oil covers the entire exposed surface of the solder wave. The thickness of the oil can be very accurately controlled by the micrometer valve and it is possible, by use of valve 65, to maintain a film of oil on top of the molten solder which film is essentially a monomolecular film. The rate of oil supply is determined in accordance with the desired thickness of oil film on the molten solder. The oil film is very tough and, even if it is pierced, it will reform immediately to provide a complete coverage on top of the solder wave, and the oil film on top of the solder wave is practically invisible except when there is some slight roughness in the solder surface.

It will be noted that the path of travel of the oil through the molten solder is very short, extending from oil inlet 60 to a point in trough 57 just above the level of solder in channel 37. Consequently, there is no chance for the oil to be broken down by the hot solder.

The oil quantity supplied, and which controls the thickness of the oil film, is set in accordance with the desired operating conditions. The rate of oil flow is a function of the "heat sink" properties of a printed circuit board passed through the soldering wave. Thus, a printed circuit board having relatively large masses of metal thereon would have a heat absorbing capacity much greater than that of a board which has a relatively small mass of metal thereon. The board having the larger mass of metal thereon will absorb heat more rapidly so that a different thickness of oil film is necessary in this case than would be used with the board having a relatively small mass of metal printed thereon. The factors involved include, for example, the temperature of the solder, the speed of travel, and so forth. With a board having a large heat sink capacity, a higher temperature of the solder is used in order that the board may be traveled faster through the solder wave. This in turn might require a change in the thickness in the oil film overlying the surface of the solder wave.

The oil film is prevented from going back to the solder pump by virtue of a dam 68 which projects downwardly into the molten solder overflowing from solder nozzle 45. This means that the solder returning to the pump must flow underneath the lower edge of dam 68. An oil outlet or drain 67 is located at the upper surface of the solder wave at a distance such that it will just draw off the oil film on top of the solder wave without necessarily drawing off any solder. Thus, the oil is drawn off after a single use and is not recirculated so that there is no opportunity for the oil to be broken down, as occurs when oil is merely mixed with molten solder.

The evenly distributed oil film on the surface of the standing wave will eliminate oxidation and thus eliminate dross formation. Any oil residue accumulating on the solder surface around the nozzle area will eliminate dross formation on that surface also.

While oil has been mentioned as the specific material forming the film on top of the solder, it should be understood that this is exemplary only. The apparatus may be used for supplying any additive to form a film on a molten solder bath and particularly on a standing solder wave. In the operation of the invention for soldering printed circuit boards, the boards are moved up along guide plate 55 and pass through the solder wave, with the oil film contacting the solder as it adheres to the components of the circuit board. The board may be passed either through the solder wave or may be passed thereover, depending upon the particular circumstances involved, and the path of travel is indicated by the arrows extending from the guide plate 55. Lateral guiding is provided by walls 41 which extend on either side of nozzle assembly 40.

While a specific embodiment of the invention has been shown and described in detail to illustrate the application of the principles of the invention, it will be understood that the invention may be embodied otherwise without departing from such principles.

What is claimed is:

1. Wave soldering apparatus comprising, in combination, a tank containing molten solder; means dividing said tank into a solder supply section and a solder return section; pump means operable to pump molten solder from said return section to said supply section; a solder discharge nozzle in solder receiving communication with said supply section and extending upwardly of said tank to provide a laterally substantially rectilinearly extending standing wave of molten solder overflowing to said return section; and means maintaining a reservoir of liquid additive with its liquid surface substantially at the level of the exit of said nozzle for contact by the molten solder discharged from said nozzle; whereby the molten solder flowing past said reservoir will draw a film of additive therefrom to uniformly and completely cover the outer surface of said solder wave.

2. Wave soldering apparatus, as claimed in claim 1, including a source of said liquid additive connected to said reservoir; and means interposed between said source and said reservoir and operable to supply additive at a preselected rate to said reservoir.

3. Wave soldering apparatus, as claimed in claim 1, including means in said return section operable to separate said film from said molten solder to discharge said film from said solder tank in advance of said supply section.

4. Wave soldering apparatus, comprising, in combination, a tank containing molten solder; means dividing said tank into a solder supply section and a solder return section; pump means operable to pump molten solder from said return section to said supply section; a solder discharge nozzle in solder receiving communication with said supply section and extending upwardly of said tank to provide a laterally substantially rectilinearly extending standing wave of molten solder overflowing to said return section; upwardly extending trough means extending laterally of said wave and having a substantially rectilinear upper edge in contact with the outer surface of said wave; and means operable to supply a liquid additive to said trough means at a rate sufficient to maintain said trough means brim full of additive; whereby the molten solder flowing past said substantially rectilinear edge will draw a film of additive from said trough means to cover the outer surface of said solder wave uniformly and completely.

5. Wave soldering apparatus, as claimed in claim 4, in which said nozzle has a substantially rectangular cross section and a discharge direction oblique to both the vertical and the horizontal; said trough means being substantially rectangular in cross section and extending along the upper transversely extending wall of said nozzle.

6. Wave soldering apparatus, as claimed in claim 5, in which said upper wall of said nozzle constitutes the lower wall of said trough.

7. Wave soldering apparatus, as claimed in claim 4, in which the entrance end of said trough means is disposed within said return section beneath the level of molten solder therein; said liquid additive supply means including an orifice opening into said tank immediately below the entrance end of said trough means, whereby liquid additive, introduced into the return section of said tank, will rise through the molten solder to flow into said trough means.

8. Wave soldering apparatus, as claimed in claim 4, in which said liquid additive supply means includes a tank containing a supply of liquid additive; a pump; an additive withdrawal line extending from said tank to said pump, an additive return line extending from said pump to said tank; a back pressure responsive valve disposed in said additive return line and maintaining the pressure of the liquid additive discharged from said pump at a preselected value; a branch line extending from said return line between said pump and said back pressure valve and leading to said trough means; and a metering valve in said branch line controlling the rate of liquid additive flow therethrough.

9. Wave soldering apparatus comprising, in combination, a substantially rectangular tank containing molten solder; horizontal partition means dividing said tank into a lower solder supply section and an upper solder return section; pump means operable to pump molten solder from said return section to said supply section; a substantially rectangular cross section riser extending upwardly from an aperture in said partition means through said solder return section for upward flow of molten solder under pressure therethrough, said riser having substantially parallel forward and rear vertically extending walls and substantially parallel vertically extending side walls; a nozzle assembly secured to the upper end of said riser and including a plate forming a partial closure for said upper end and a solder discharge nozzle extending upwardly and forwardly from said riser and in communication therewith; said riser being so located that an annular channel is formed therearound between the exterior surface of said riser and the interior surface of said return section; said solder discharge nozzle including spaced forward and rear walls converging toward the exit of said solder discharge nozzle, and the exit thereof being substantially above the upper level of molten solder in said return section whereby, as molten solder is forced by pressure upwardly through said riser and through said solder nozzle, a standing wave of molten solder is formed which overflows to said channel in said return section; means, including the rear wall of said solder nozzle, forming a substantially rectangular cross section trough open at both ends extending parallel to said rear wall and terminating at the outer end thereof, said trough including an outer wall projecting laterally of said riser into said channel, the inner wall of said trough terminating at the outer surface of said riser; said trough being laterally substantially coextensive with said solder nozzle; means supplying a liquid additive into said channel in said solder return section at a point directly beneath the extending portion of the outer wall of said trough, whereby the introduced liquid additive will rise trough the molten solder and be guided into said trough to form a reservoir of liquid additive whose upper surface is arranged to be contacted by the outer surface of said solder wave flowing thereby to draw a film of liquid additive from said trough to uniformly and completely cover the outer surface of said solder wave.

10. Wave soldering apparatus, as claimed in claim 9, in which the inner wall of said trough and the rear wall of said solder nozzle are common to each other.

11. Wave soldering apparatus, as claimed in claim 10, in which said common wall extends upwardly at a small angle to the vertical and then forwardly at a relatively small angle to the horizontal; the outer wall of said trough extending parallel to said common wall throughout the length of the latter.

No references cited.

WHITMORE A. WILTZ, *Primary Examiner.*